United States Patent [19]

Revells et al.

[11] 4,015,968
[45] Apr. 5, 1977

[54] GLASS SHEET SUPPORTING AND CONVEYING APPARATUS

[75] Inventors: Robert G. Revells, Toledo, Ohio; Earl J. Olson; Charles W. Sutton, both of Lathrop, Calif.

[73] Assignee: Libbey-Owens-Ford Company, Toledo, Ohio

[22] Filed: Nov. 20, 1975

[21] Appl. No.: 633,868

[52] U.S. Cl. .................................. 65/289; 65/273; 65/349

[51] Int. Cl.² ........................................ C03B 23/02

[58] Field of Search ............ 65/106, 273, 275, 163, 65/349, 350, 351, 289

[56] References Cited

UNITED STATES PATENTS

| 3,545,951 | 2/1967 | Nedelec | 65/275 X |
| 3,905,794 | 9/1967 | Revells et al. | 65/106 |

Primary Examiner—Arthur D. Kellogg
Attorney, Agent, or Firm—Collins, Oberlin & Darr

[57] ABSTRACT

An apparatus for supporting and conveying glass sheets on a series of conveyor rolls having arcuately curved central portions normally disposed in an upper common horizontal plane for supporting a flat sheet of heat-softened glass to be bent and pivotable into a lower angular position out of engagement with said flat sheet upon engagement thereof along its marginal edge portions by the shaping rail of an upwardly movable female press member. Each conveyor roll is provided with a two-piece coupling comprised of a first section secured to the conveyor roll and a second section operatively connected to a drive arrangement. The sections are angularly rotated relative to each other to effect precise angular adjustments therebetween for varying the angular attitude of the associated conveyor roll in its lower position of use.

5 Claims, 8 Drawing Figures

U.S. Patent  April 5, 1977  Sheet 4 of 4  4,015,968
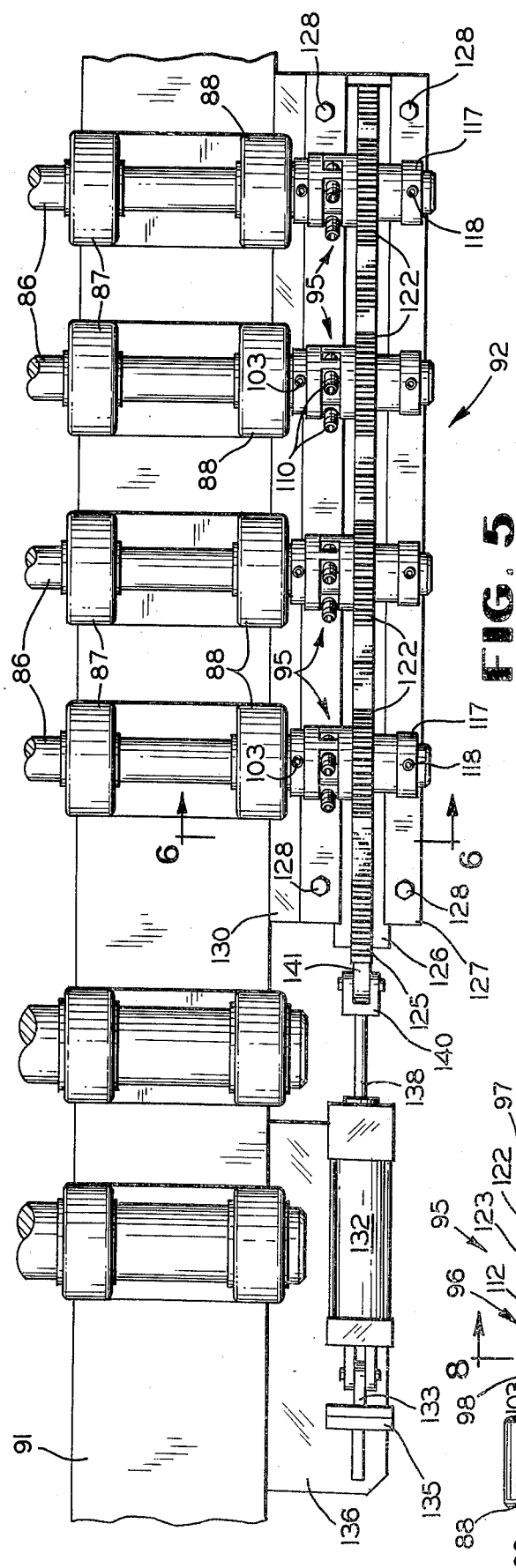
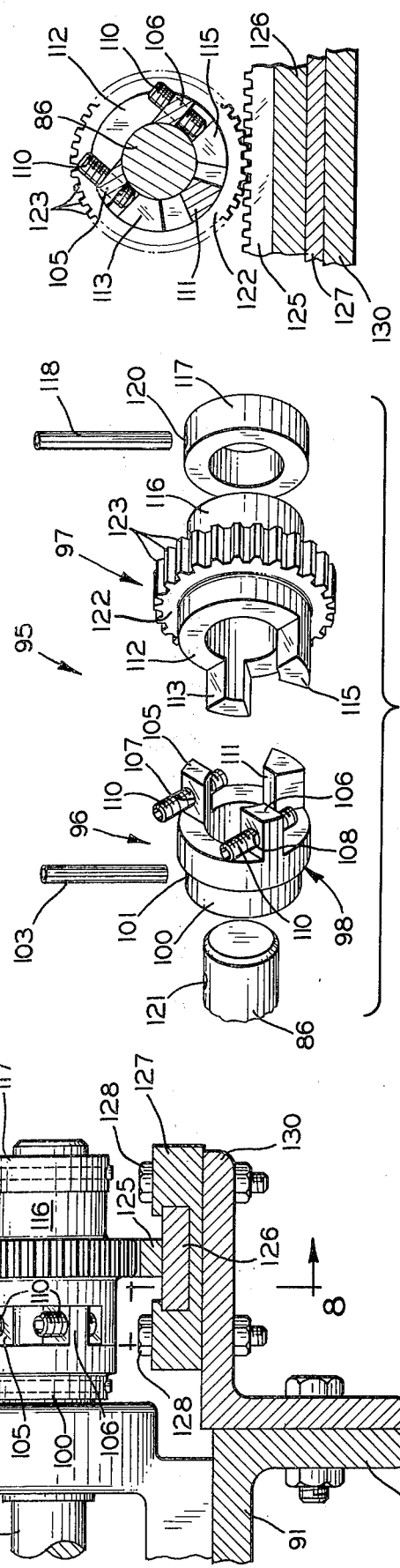

GLASS SHEET SUPPORTING AND CONVEYING APPARATUS

BACKGROUND OF THE INVENTION

The present invention relates generally to glass supporting and conveying apparatus and, more particularly, to a finely adjustable shifting arrangement for specially configurated, flexible, pivotal conveyor rolls utilized in a press bending apparatus.

In one known commercial production of curved or bent glass sheets in large quantities, such as is encountered in the mass production of glazing closures for automobiles and the like, the sheets are supported in a horizontal plane and advanced in a horizontal path on externally driven roll-type conveyors successively through a heating area, a bending area and a heat treating area for annealing or tempering the bent sheets. The heated glass sheets are advanced from the heating furnace into the bending area and accurately located therein between complemental upper and lower shaping members by the engagement of the leading edges thereof with locating stops positioned in the path of movement of the advancing sheets. When properly oriented, the sheet is engaged along its marginal edge portions by the lower press member and lifted from the conveyor rolls for pressing between the complemental shaping surfaces of the press members to the desired curvature.

One problem encountered in the production of glazing closures by the above described process is the occurrence of certain optical defects, commonly known as "roll distortion", in the finished glazing closures. Such distortion is caused by the marring of the glass sheet surfaces due to the relative frictional movement between the glass surfaces and the rotating conveyor rolls when the sheet is in the heat-softened condition necessary for proper bending. This relative movement is most likely to occur advancing movement of the sheet is interrupted by the locating stops while the conveyor rolls continue to rotate. Even if the timing is precisely controlled so that the initiation of the glass lifting operation occurs simultaneously upon glass stoppage to avoid any time lag therebetween, the heat-softened central portions of the glass sheets located inwardly of the press contacting marginal edges thereof sag sufficiently to remain in contact with the rotating conveyor rolls for at least a limited time. While this distortion can be tolerated in vertically disposed glazing closures, it becomes more pronounced in those glazing closures intended for mounting at relatively sharp angles, such as the backlights of the more recently styled automobiles for example, and poses serious optical problems interferring with clear or true vision therethrough.

The method and apparatus disclosed and claimed in U.S. Pat. No. 3,905,794, granted Sept. 16, 1975, and assigned to the same assignee as the present invention, provided a solution to the problem of objectionable roll distortion by utilizing a series of conveyor rolls having arcuately curved central portions normally disposed in an upper common horizontal plane for supporting a flat sheet of heat-softened glass to be bent and pivotable into a lower position out of engagement with said flat sheet upon engagement thereof along its marginal edge portions by the shaping rail of an upwardly movable female press member. The present invention constitutes an improvement over U.S. Pat. No. 3,905,794 by making certain improvements in the actuator for pivoting the rolls in unison and for precisely adjusting and the maintaining the conveyor rolls in their desired angular attitudes.

SUMMARY OF THE INVENTION

Accordingly, it is a primary object of the present invention to provide an improved actuator for pivoting arcuately shaped conveyor rolls in a more efficient manner and more effectively controlling their angular attitudes.

Another object of this invention is to provide an improved actuator capable of effecting initial adjustment of the conveyor roll attitudes precisely and with ease and then maintaining such angular attitudes during prolonged periods of operation.

These and other objects, advantages and characterizing features of the present invention will become clearly apparent from the ensuing detailed description of an illustrative embodiment thereof, taken together with the accompanying drawings wherein like reference numerals denote like parts throughout the various views.

BRIEF DESCRIPTION OF THE DRAWINGS

FIG. 5 is a fragmentary top plan view of the conveyor roll actuating means constructed in accordance with this invention;

FIG. 6 is a vertical sectional view, on an enlarged scale, taken along line 6–6 of FIG. 5;

FIG. 7 is an exploded view, showing details of the roll actuating and adjusting means of this invention; and FIG. 8 is a vertical sectional view, taken along line 8—8 of FIG. 6.

DESCRIPTION OF THE PREFERRED EMBODIMENT

Figure 1:
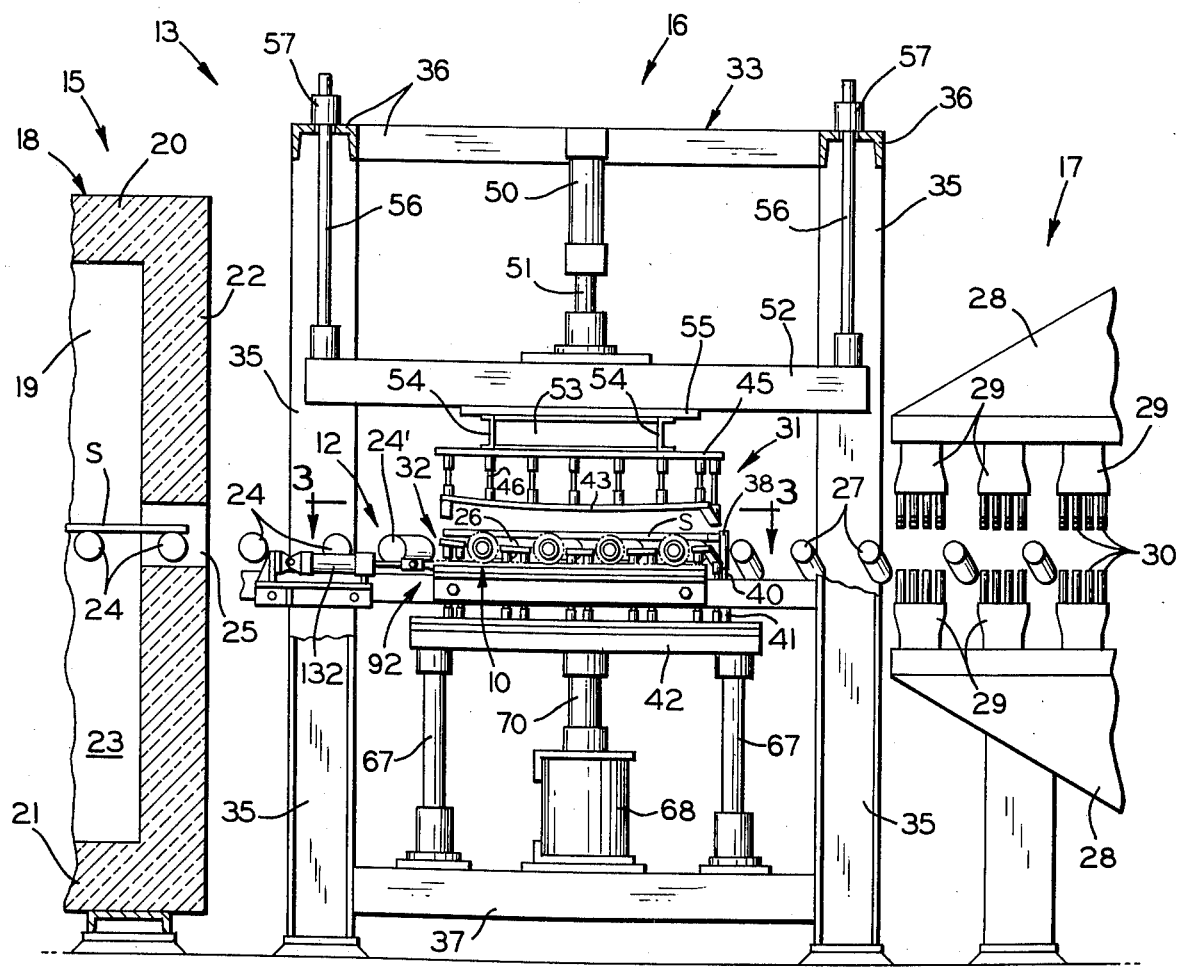
FIG. 1 is a side elevational view of a bending apparatus interposed between a glass heating and tempering station and embodying the glass sheet supporting and conveying apparatus of this invention.

Referring now in detail to the illustrative embodiment depicted in the accompanying drawings, there is shown in FIG. 1 a glass sheet supporting and conveying apparatus, generally designated 10, constructed in accordance with this invention and forming a part of a continuous conveyor system, comprehensively designated 12. The conveyor system 12 forms a component part of a bending and tempering apparatus, generally designated 13, particularly adapted for use in the production of bent, tempered glass sheets by a continuous process in which the sheets to be treated are supported and moved successively along a predetermined horizontal path on conveyor system 12 through a heating section 15, a bending section 16, and a tempering section 17, the sections being contiguous so that a sheet passes immediately from one section to the next succeeding section.

In the illustrated embodiment, the heating section 15 comprises a tunnel-type furnace 18 having a heating chamber 19 defined by a top wall 20, a bottom wall 21, a forward end wall (not shown), a rear end wall 22 and opposite side walls 23, all formed of a suitable refractory material. The chamber 19 can be heated in any desired manner by suitable heating means, such as gas fired burners or electrical resistance elements for example (not shown), located in the top and side walls of the furnace 18. The sheets S are advanced through the heating chamber 19 on a series of conveyor rolls 24, which form a part of the conveyor system 12, and extend from the entrance end (not shown) of the furnace 18, through the oppositely disposed exit end and toward the bending section 16. The sheets S are heated to substantially the softening point of the glass during their passage through the chamber 19 and, upon emerging from an opening 25 in the rear end wall 22 of furnace 18, are received on a second series of conveyor rolls 26, which form a part of the supporting and conveying apparatus 10 of this invention and move the sheets to and within the bending section 16 between a pair of press members, hereinafter more fully described, for imparting the desired curvature to the sheets S.

After bending, the sheets S are advanced along the path and are transferred from the conveyor rolls 26 onto a third set of conveyor rolls 27, forming a part of the conveyor system 12, and which move the bend sheets S to and through the tempering section 17 wherein their temperature is rapidly reduced to produce the proper temper in the glass. In the embodiment illustrated in FIG. 1, the tempering section 17 includes cooling means comprising upper and lower blastheads 28 disposed above and below the path of movement of the glass sheets, each being provided with a plurality of manifold sections 29 having a series of tubes 30, respectively, operable to direct opposed streams of cooling fluid, such as air or the like, toward and against the opposite surfaces of the sheets S moving along such path.

The bending apparatus within section 16 comprises an upper male press member 31 and a lower female press member 32 having opposed complemental shaping surfaces conforming to the desired curvature of the sheet to be bent. The press members 31 and 32 are mounted for relative movement toward and away from each other on a structural frame 33, which includes a framework of vertically disposed columns 35 and horizontally extending beams 36 interconnected and tied together to form a rigid, box-like structure. A base member 37 extends between the upright columns 35 for supporting the female press member 32 and associated parts. The male press member 31 is mounted above the conveyor rolls 26 for vertical reciprocal movement relative to frame 33 while the female press member 32 is located below the conveyor rolls 26 and mounted for vertical reciprocal movement toward and away from the male press member 31.

A pair of laterally spaced locator stops 38 are positioned in the path of movement of the advancing glass sheets S to accurately position the same in the desired location relative to the press members 31 and 32. Each stop 38 is secured to the distal end of a piston rod 40 of a fluid actuating cylinder 41 mounted on a carriage 42. The cylinders 41 are operative to raise and lower the stops 38 between an upper position above conveyor rolls 26 in the path of movement of the glass sheet S and a lower position therebeneath.

In the illustrative embodiment shown in the drawings, the male press member 31 is of outline or ring-type construction and comprises a continuous shaping rail 43 (FIGS. 1 and 4) connected to a base member 45 by a plurality of connecting rods 46. The shaping rail 43 conforms in outline to the glass sheets S to be bent and is provided with a downwardly directed, generally convex shaping surface 47 to impart the desired curvature to the sheet. However, the particular outline of the shaping rail 43, as well as the specific curvature of the shaping surface 47, is dictated by the desired shape of the glass sheet being bent and can vary widely, as desired. Also, a conventional male mold having a substantially continuous shaping surface may be used in lieu of the ring-type press member 31, if desired.

The means for supporting the male press member 31 on frame 33 include at least one actuating cylinder 50 (FIG. 1) mounted on one of the upper horizontal beams 36 and having a suitable reciprocable piston (not shown) provided with a piston rod 51 connected at its outer end to a vertically reciprocal platen frame 52. The base member 45 of the male press member 31 is connected to the platen frame 52 for movement therewith by means of interconnected structural members 53 and 54 and a support plate 55 extending transversely of the platen frame 52. A plurality of guide posts 56 are connected at their lower ends to the four corners of platen frame 52, respectively, and extend upwardly through suitable bushings 57 mounted on upper horizontal beams 36 for sliding movement relative thereto to properly guide platen frame 52 during its vertical reciprocal movement.

Figure 2:
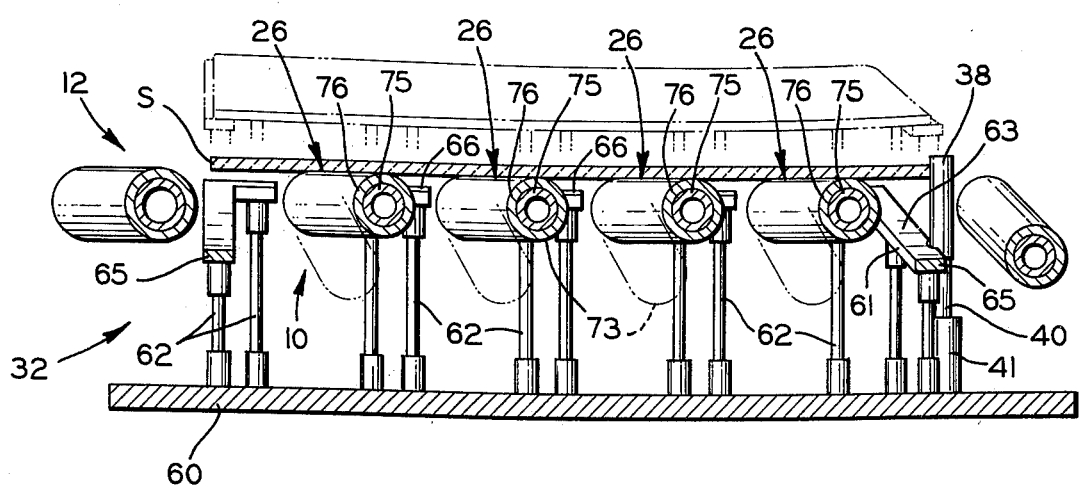
FIG. 2 is an enlarged vertical sectional view, showing the conveyor rolls in an upper position of use in full lines and a lower position of use in dotted lines.
Figure 3:
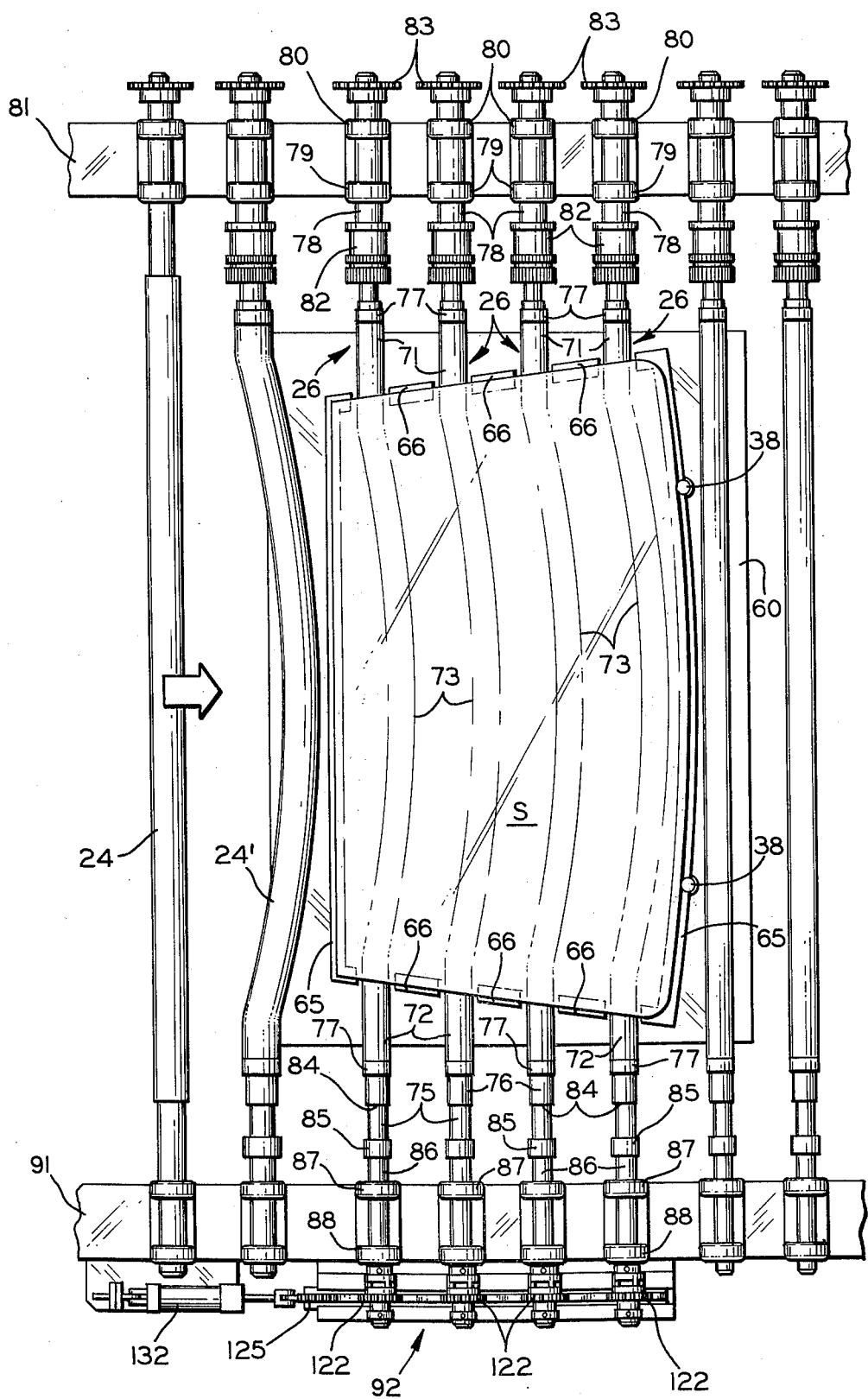
FIG. 3 is a partial top plan view, on an enlarged scale, looking in the direction of arrows 3–3 of FIG. 1, and showing the conveyor rolls in relation to the lower press member.
Figure 4:
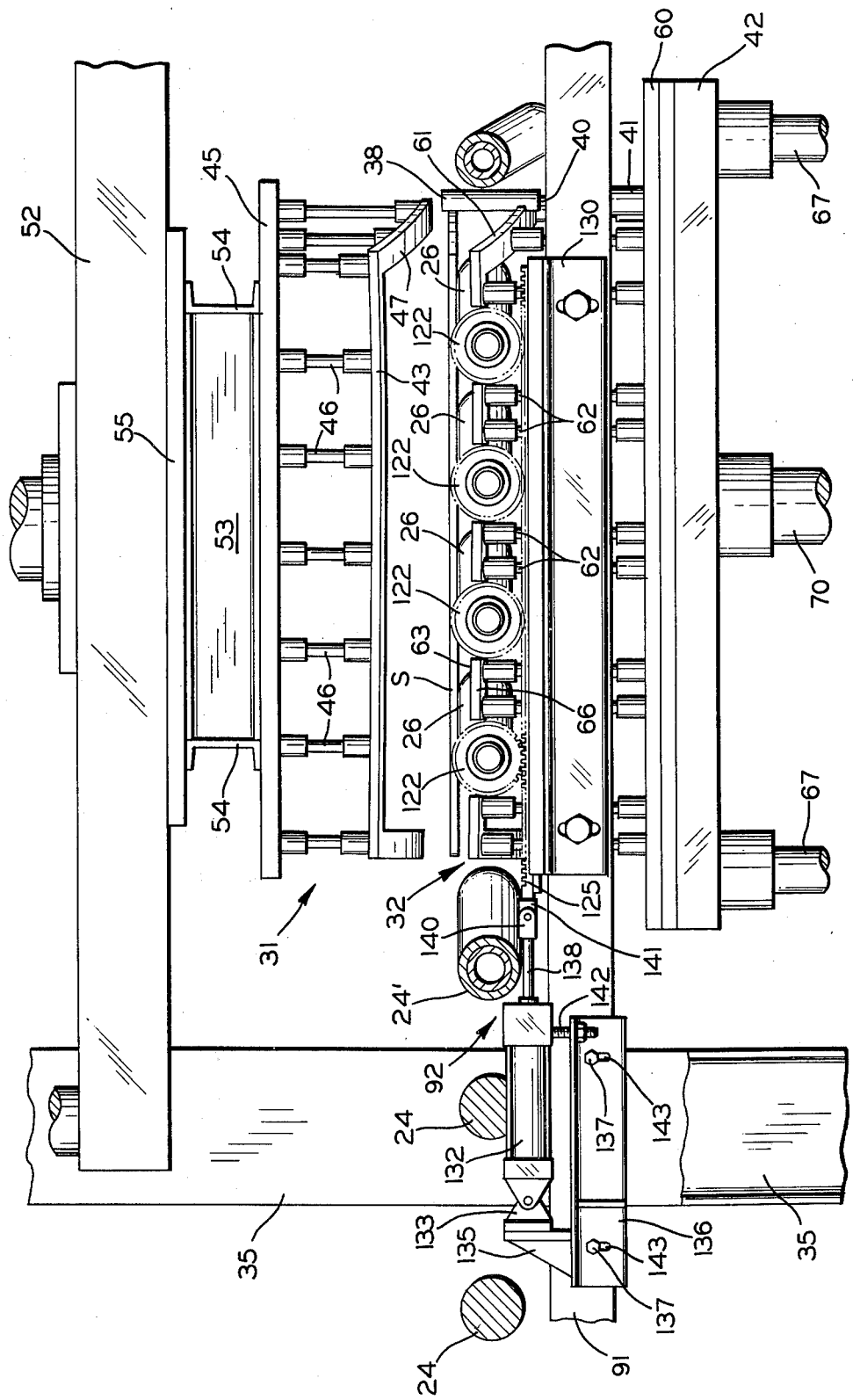
FIG. 4 is an enlarged side elevational view, partly in section, of the bending apparatus and glass supporting conveyor of FIG. 1.

The female press member 32 is also of outline or ringtype construction and comprises a base member 60 secured to the carriage 42 and a shaping rail 61 connected to the base member 60 in spaced relation thereto by means of a series of connecting rods 62 (FIGS. 2 and 4). The shaping rail 61 conforms in outline to the glass sheet S to be bent and is provided on its upper face with a generally concave shaping surface 63 complementary to the male press member shaping surface 47 in opposed relation thereto. To permit displacement of the female shaping rail 61 above the level of the conveyor rolls 26 for lifting the sheets thereabove into pressing engagement with the male shaping rail 43, the female shaping rail 61 is formed of a plurality of segments (FIG. 3) including end bars 65 extending generally in the direction of rolls 26 and side bars 66 extending generally transversely to the conveyor rolls 26 and spaced apart from each other a sufficient distance to pass between adjacent rolls 26. As compared to rolls 24, the diameters of rolls 26 are formed relatively small to provide maximum clearance therebetween for the passage of the female press member segments therethrough.

The carriage 42 is supported by a pair of guide members 67 and vertically movable by a fluid actuator 68 mounted on base member 37 and having a suitable piston rod 70 for raising and lowering the female press member 32 between is lower position beneath conveyor rolls 26 and its upper position thereabove for lifting a heated glass sheet S from the conveyor rolls 26 and pressing the same against the male press member 31 between the complemental shaping surfaces 47 and 63, thus forming the glass sheet into the desired curvature. After bending, piston rod 70 is retracted to lower the female press member 32 below conveyor rolls 26, depositing the bent sheet thereon for advancement into the tempering section.

As best shown in FIG. 3, each conveyor roll 26 comprises straight opposite end portions 71 and 72 having a common axis and a central, arcuately curved portion 73 joining the two straight end portions 71 and 72. As best shown in FIG. 2, each conveyor roll 26 comprises an inner, hollow, flexible, substantially stationary core member 75 and an outer, flexible load carrying, rotatable sleeve 76. To facilitate rotation of the outer sleeve 76 about core 75, the former may be comprised of a liner formed of a suitable anti-friction material, such as a fluorocarbon resin for example, covered with a layer of stainless steel mesh to reinforce the same and prevent kinking thereof. While the outer sleeve 76 is flexible for conforming to the arcuate shape of the inner core 75, it is capable of transmitting torque without significant axial twist or distortion. The sleeve 76 can be covered with an asbestos or fiberglass material to provide a resiliently yieldable, heat resistant, non-marring surface upon which the glass sheets are received. The covering is secured by stretching it over the sleeve 76 and fastening the ends thereto with pressure sensitive tape 77 or in some other suitable manner. One end of each inner core member 75 is mounted on a stub shaft (not shown) mounted in a suitable collar 78 journalled for rotation in spaced bearings 79 and 80 carried on a rail 81 extending along one side of the bending apparatus. The outer sleeve member 76 is coupled to collar 78 for rotation therewith relative to inner core member 75 by means of a suitable coupling 82, which can be of the type described and illustrated in the aforesaid U.S. Pat. No. 3,905,794.

A pinion 83 is rigidly secured to each collar 78 and an endless drive chain (not shown) is trained about the several pinions 83 for rotating collars 78 and thereby the outer sleeve members 76 of rolls 26 in unison at the same angular speed about their respective chordal axes. The other opposite ends of sleeve members 76 are left free, as best shown at 84 in FIG. 3, for free rotation relative to their associated core members 75. The end of each core member 75 remote from collar 78 is detachably connected, by means of a quick connect-disconnect coupling 85, to a rotatable drive shaft 86 mounted in spaced bearings 87 and 88 carried on a rail 91 extending lengthwise of the bending apparatus. Each shaft 86 is operatively connected to the roll pivoting or shifting apparatus, generally designated 92, constructed in accordance with this invention and which will presently be described in detail.

In addition to rotation about their own chordal axes, the rolls 26 are mounted for pivotal movement in unison between a first position in which the curved portions 73 thereof lie in a common horizontal plane as shown in full lines in FIG. 2, and a second or lower position in which the curved portions 73 lie in attitudes extending at angles to said common plane as shown in dotted lines in FIG. 2. When in the latter position, the curved portions 73 conjointly define a curved surface complementary to the curvature imparted to the glass sheet. In accordance with the principles of this invention, the roll shifting means 92 is provided for shifting the rolls 26 between the two positions described above.

As hereinbefore mentioned, the invention disclosed and claimed in the aforesaid U.S. Pat. No. 3,905,794 minimized, if not completely eliminated, roll distortion or marking previously experienced in conventional horizontal processes by providing pivotal, arcuately shaped, glass supporting rolls disengageable from the glass sheet at the appropriate time in a bending operation to avoid relative frictional movement between the glass sheet and the rotating rolls. The means for pivoting or shifting the rolls in this earlier patent comprised a mechanical linkage arrangement including lever arms connected at their one ends to the roll shafts and at their other ends to a common actuating rod. Misalignment of any one or more rolls out of the desired curved surface conjointly defined by the arcuate rolls required the adjustment of associated lever arms and posed serious problems in accurately bringing such rolls into alignment with the other rolls of the set. In addition to shutting down the apparatus for such adjustments, it was difficult to effect the necessary adjustment with the precision required. Moreover, the stresses on these lever arms, created by the loads imposed on the rolls and transmitted thereto, sometimes became intolerable and on occasion were great enough to force a lever arm off its associated roll shaft.

The roll shifting means 92 of the present invention obviates some of the above noted disadvantages and constitutes an improvement over the roll shifting means described in U.S. Pat. No. 3,905,794 by providing means for quickly and precisely adjusting to the desired extent the angular attitudes of the rolls relative to a true horizontal plane and maintaining the rolls in such angular attitudes. To this end and as best shown in FIG. 7, the roll shifting means comprises a composite or two-piece coupling, generally designated 95, comprising a first coupling section 96 adapted to be secured to drive shaft 86 and a second coupling section 97 operatively connected to the drive, as will hereinafter be more fully explained.

Coupling section 96 comprises a tubular or hollow body 98 of generally cylindrical outline adapted to telescopically fit over the end portion of drive shaft 86. Body 98 is provided with a cylindrical flange 100 of reduced diameter having diametrically opposed openings 101 adapted to be aligned with a transverse bore formed in shaft 86 for receiving a retainer pin 103 therethrough to rigidly secure coupling section 96 to drive shaft 86. A pair of generally flat lugs or projections 105 and 106 extend axially outwardly from the face of body 98 remote from flange 100 and is provided with tapped openings 107 and 108, respectively, for receiving threaded screws 110 therethrough. A third lug 111, substantially equally circumferentially spaced from lugs 105 and 106, also projects axially outwardly from the body 98 in parallelism with lugs 105 and 106.

Coupling section 97 comprises a tubular or hollow body 112 of generally cylindrical outline also adapted to telescopically fit over the end portion of drive shaft 86. A pair of spaced lugs 113 and 115 project outwardly from the inner face of body 112 and are received in the spaces defined between lugs 105,106 and 111 of the first coupling section 96. Screws 110 are threaded, as required, to bring their respective inner ends into bearing engagement against lugs 113 and 115 and angularly orient the coupling sections 96 and 97 relative to each other to the extent desired. The torque imparted to drive coupling section 97 is then transmitted directly to coupling section 96 via lugs 113 and 115, screws 110 and lugs 105 and 106.

Body 112 is provided with a reduced diameter rear end portion 116 which bears against a retaining collar 117 fixed to drive shaft 86 by means of a retainer pin 118 received in the aligned openings 120 and 121 of the collar and drive shaft, respectively. The retaining collar 117 permits rotary movement of body 112 while preventing axial movement thereof off drive shaft 86. A pinion gear 122 is welded or otherwise fixedly secured to body 112 and is provided with peripheral teeth 123 engaging and meshing with a gear rack 125 secured to the upper face of a slide 126. The slide 126 is guided for axial sliding movement in a guide block 127 affixed by suitable fasteners 128 to the horizontally extending leg of an angle member 130 bolted to one leg 131 (FIG. 6) of the structural member forming rail 91.

The means for actuating slide 126, and thereby gear rack 125, includes a fluid cylinder 132 pivotally mounted at its head end to a lug 133 affixed to a bracket 135 secured to the horizontal leg of an angle member 136 secured, as by means of fasteners 137, along its vertical leg to the rail 91. Cylinder 132 is provided with the usual reciprocal piston (not shown) connected to a piston rod 138, in turn connected as shown at 140 in FIGS. 4 and 5 to an axial extension 141 of the slide 126. Retraction of the piston rod 138 effects axial movement of the slide 126 and gear rack 125 toward the left, as viewed in FIGS. 4 and 5, to rotate the several gears 122 in unison in a clockwise direction for shifting the central portions 73 of rolls 26 from an upper horizontal disposition to a lower angular disposition, i.e., from the full line position to the dotted line position shown in FIG. 2.

The central curved portion 73 of rolls 26 are initially disposed in their upper positions shown in full lines in FIGS. 2 and 4 wherein they lie in a common horizontal plane to support a heated flat glass sheet entering the bending sections 16. The gear rack 125 is adapted to be actuated simultaneously with upward movement of the female press member 32 so that the rolls 26 are pivoted downwardly in angular attitudes or planes relative to such common horizontal plane out of engagement with the glass sheet just as the marginal edge portions of the sheet are engaged by the shaping rail 61 to lift the same upwardly. When the bent sheet is returned to the conveyor rolls 26 after bending, the roll curved portions 73 conjointly define a curved surface complementary to the curvature imparted to the sheet and preclude any sagging out of the desired curvature as the bent sheet is conveyed out of the bending section 16. It should be understood that the degree of curvature imparted to the central portions 73 of conveyor rolls 26 is dictated by the desired curvature formed in the glass sheet and may vary, as desired. Because of the flexibility of the rolls 26, they can be initially bent to any desired geometrical form, including angular or V-shaped bends, to conform to the shape of the bent glass sheet being produced in a given production run and can be replaced by differently shaped rolls when bending glass sheets of different configurations. Once bent into the desired shape, the rolls are sufficiently rigid to remain set in this shape and will not be deformed out of such shape by the loading of the glass sheets thereon. Instead of physically bending the rolls 26, variance in the curvature of the surface conjointly defined thereby may be effected by manipulating screws 110 to effect angular rotation of coupling sections 96 relative to their associated coupling sections 97 and thereby vary their lower angular attitudes.

As best shown in FIG. 4, an adjusting screw 142, projecting vertically through the horizontal leg of angle member 136 and bearing against the rod end of cylinder 132, can be manipulated to level or adjust the horizontal disposition of the cylinder. Also, the fasteners 137 securing the angle member 136 to rail 91 are received in elongated vertical slots 143 to effect further vertical adjustments of the cylinder 132, as required or desired.

A significant advantage residing in the coupling 95 of the present invention is the fine adjustment that can be effected between the coupling sections 96 and 97 to precisely position the associated conveyor roll 26 in its proper angular attitude relative to the other rolls 26 when in their lower positions. The lugs 113 and 115 fit into the recesses or spaces between lugs 105, 111 and lugs 106, 111 respectively, in a manner providing sufficient clearance therebetween to accommodate angular adjustments between the two coupling sections 96 and 97. By properly manipulating screws 110 to rotate one coupling section relative to the other, a very fine and precise angular adjustment can be made. Moreover, the bearing relation of the screws 110 against lugs 113 and 115 maintains this desired angular relationship between the sections 96 and 97 during operation. This is important in initially setting the angular attitudes of the several conveyor rolls 26 precisely in accord with the desired conjoint surface to be defined thereby for conformance with the curvature of the sheet after shaping and also in readily and accurately making necessary adjustments without machine shutdown during operation in the event one or more conveyor rolls 26 become slightly displaced out of their initial position relative to the other rolls 26 during such operation.

Upon leaving bending section 16, the bent glass sheets are transferred from the series of conveyor rolls 26 to the series of conveyor rolls 27 for advancement into and through the tempering section 17. The conveyor rolls 27 also are formed with arcuately curved central portions which conjointly define a supporting surface conforming to the curvature of the bent glass sheet S. While the conveyor rolls 27 are of identical construction and rotatable about their chordal axes in the same manner as rolls 26, preferably they are substantially fixed and not pivotal between upper and lower positions of use as the conveyor rolls 26. Of course the rolls 27 also can be mounted for pivotal movement, if desired. Thus, the curvature imparted to the glass sheet during the bending thereof is continuously maintained during its course of travel through the bending section 16 and the tempering section 17 by means of the pivotal, arcuately curved conveyor rolls 26 and the substantially conveyor rolls 27.

In operation, heat-softened sheets of glass S leaving the furnace 18 are advanced in a horizontal path and transferred from the conveyor rolls 24 onto the conveyor rolls 26, which have been shifted to a position disposing their arcuately curved central portions 73 in a common horizontal plane for properly supporting the heated flat glass sheets being conveyed thereby. As best shown in FIG. 3, the last roll 24' of the series of rolls 24 adjacent the series of rolls 26 is arcuately curved in the common plane of the central portions 73 of rolls 26 to minimize the space between such last roll 24' and the first roll 26 and maintain adequate support for the glass sheet during its transfer from one to the other set of rolls. The roll 24' is of the same diameter as the other rolls 24, which are larger in diameter than the diameter of rolls 26, and is fixedly mounted against pivotal movement, but otherwise has the same inner core-outer rotatable sleeve construction as rolls 26.

A photoelectric cell (not shown), or other suitable detection device, senses the entry of the glass sheet into the bending section 16 for initiating a bending cycle of energizing timing mechanisms which control the actions of the press actuating cylinder, the roll shifting cylinder 132 and the stop cylinders 41. The timing mechanisms are so designed that the female press member 32 begins its ascent by actuation of cylinder 68 and engages the marginal edge portions of the flat glass sheet just prior to the leading edge thereof engaging the locator stops 38. As the shaping rail 61 engages the glass sheet marginal edge portions, the roll shift cylinder 132 becomes operative to retract gear rack 125 and rotate gears 122 clockwise to pivot or shift the central portion 73 of conveyor rolls 26 downwardly in unison into their angular attitudes out of contact with the sheet so that the latter is supported entirely along its marginal edges on shaping rail 61. Since the heat-softened glass sheet is supported only along such marginal edge portions, the inner central portions thereof tend to sag upon upward movement of the sheet. However, the rolls 26 have been pivoted downwardly out of the way so that the sheet rolls as otherwise would occur if left in their original common plane.

The engagement of the shaping rail 61 with the glass sheet and the disengagement of the roll central portion 73 therefrom occurs substantially simultaneously and just prior to, say a few microseconds before, engagement of the leading edge of the sheet with stops 38 so that the roll central portions 73 are disengaged from the glass sheet upon stoppage thereof. Accordingly, the possibility of marring the glass sheet due to the relative frictional movement between the peripheral surfaces of the rotating rolls 26 and the stationary glass sheet is eliminated to thereby significantly minimize, if not entirely eliminate, distortion otherwise caused by such relative frictional movement.

As the sheet S continues to be lifted for pressing engagement against the male press member 31, the locator stops 38 are lowered to a point below the level of the top surfaces of conveyor rolls 26 when in their lowermost attitude to permit advancement of the sheet when subsequently returned to the conveyor rolls 26.

After the glass sheet has been shaped between the press members 31 and 32, the female press member 32 is lowered below the downwardly directed conveyor rolls 26 to deposit the bent sheet thereon for advancement out of the bending section 16. When shifted into their lower positions, the central portions 73 of rolls 26 assume attitudes conjointly defining a supporting surface complementary to the curvature of the bent sheet. The bent sheet is advanced along such supporting surface at the proper rate of speed out of the bending section 16 and onto the contoured supporting surface defined by conveyor rolls 27 for advancement into and through the tempering section 17 between the opposed tubes 30 of blastheads 28 at a speed promoting a proper rate of cooling to obtain the desired temper in the sheets. When the trailing edge of the bent sheet leaves the last conveyor roll 26 in bending section 16, the cylinder 132 is actuated by suitable control means responsive to a signal generated by a photocell or the like, to extend gear rack 125 and pivot the rolls 26 into their upper positions wherein the central portions 73 thereof lie in the aforementioned common plane in readiness for the next bending cycle.

From the foregoing, it is apparent that the objects of the invention have been fully accomplished. As a result of this invention, an improved roll shifting arrangement is provided for pivoting arcuately shaped conveyor rolls in a manner accurately controlling the angular attitudes thereof when swung into their lower supporting and conveying positions. By the provision of a two-piece coupling arrangement, quick and precise adjustment of the angular attitudes of the conveyor rolls can be readily and accurately effected. Moreover, once made, such adjustments are maintained over extended periods of use.

It is to be understood that the form of the invention herewith shown and described is to be taken as an illustrative embodiment of the same, and that various changes in the shape, size and arrangement of parts may be resorted to without departing from the spirit of the invention.

We claim:

1. In apparatus for supporting and conveying sheets of glass, a frame, a plurality of rotatable conveyor rolls mounted on said frame, each of said conveyor rolls being formed of an inner core member and an outer flexible load supporting sleeve, drive means for rotating said sleeves about said core members, respectively, said conveyor rolls each having straight opposite end portions and an arcuately shaped central portion, and means for pivoting said conveyor rolls to displace said central portions of said rolls from a common plane supporting said glass sheet to angular positions disengaging said roll central portions from said glass sheet; the improvement wherein said pivoting means comprises a shaft operatively connected to said inner core member of each of said rolls, a coupling mounted on each said shaft and having a first section rigidly secured to said shaft and a second section freely rotatable on said shaft, means for rotating the several second coupling sections, means transmitting the torque from said second coupling sections to said first coupling sections to effect shifting of said conveyor roll central portions between said common plane and said angular positions, and means for angularly adjusting one of said coupling sections relative to the other of said coupling sections.

2. Apparatus according to claim 1, wherein said torque transmitting means comprises axially projecting lugs on each of said coupling sections intermeshing with the lugs of the other coupling section.

3. Apparatus according to claim 2, wherein said adjusting means comprises screws projecting through said lugs of one of said coupling sections and bearing against the lugs of the other of said coupling sections.

4. An apparatus according to claim 1, wherein said means for rotating said second coupling sections comprises a peripheral gear on each of said second coupling sections, an elongated gear rack engageable with the several gears, and means for moving said gear rack longitudinally to rotate said gears.

5. Apparatus according to claim 1, in combination with a bending member having an upwardly facing shaping surface thereon, means for moving said bending member upwardly to engage the marginal edge portions of said glass sheet and lift the same from said conveyor rolls into pressing engagement against an upper complemental bending member said means for pivoting said conveyor rolls to disengage said roll central portions from said sheet being operable upon engagement of said shaping surface with said marginal edge portions during upward movement of said bending member.

* * * * *

UNITED STATES PATENT AND TRADEMARK OFFICE
CERTIFICATE OF CORRECTION

PATENT NO. : 4,015,968

DATED : April 5, 1977

INVENTOR(S) : Robert G. Revells et al

It is certified that error appears in the above—identified patent and that said Letters Patent are hereby corrected as shown below:

```
Col. 1, line 39, after "occur" insert --when--
Col. 2, line 3, "the" should be --then--
Col. 4, line 62, "is" should be --its--
Col. 8, line 50, after "substantially" insert --fixed--
Col. 9, line 3, "of" should be --by--
Col. 9, line 23, after "sheet" insert --inner central portions
    can sag freely without contacting the--
```

Signed and Sealed this

Seventh Day of June 1977

[SEAL]

Attest:

RUTH C. MASON
*Attesting Officer*

C. MARSHALL DANN
*Commissioner of Patents and Trademarks*